Jan. 1, 1924. 1,479,058
M. F. DALY
WOODWORKING MACHINE
Filed Jan. 23, 1923 4 Sheets-Sheet 3
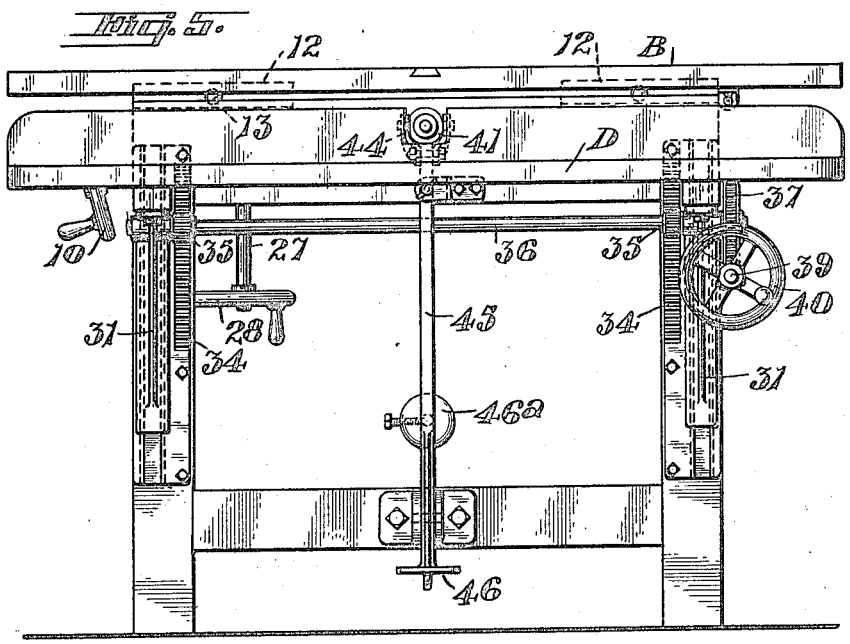
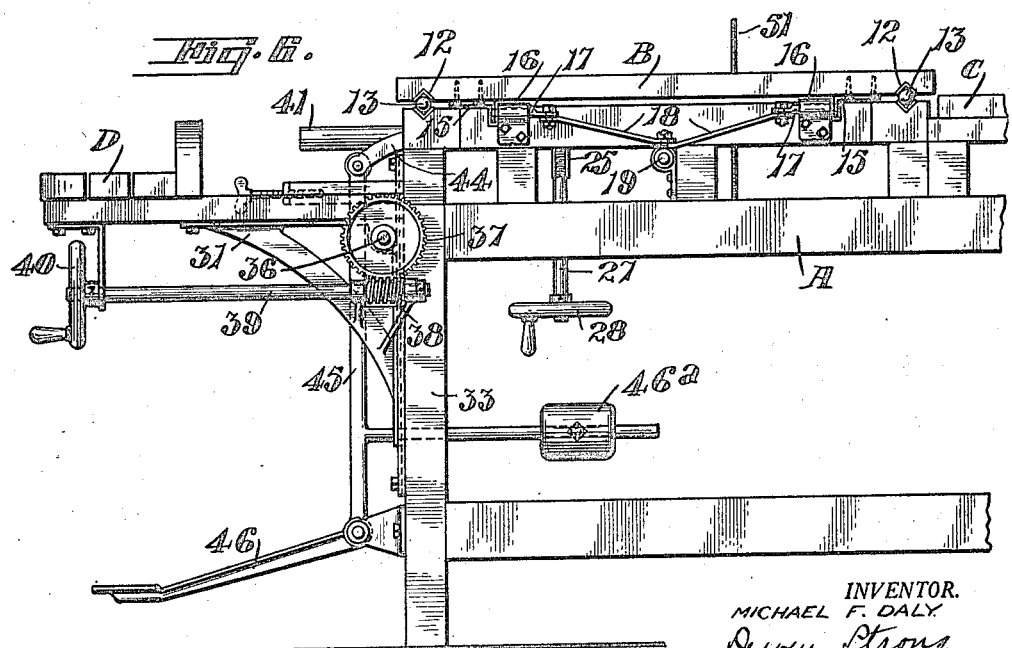
INVENTOR.
MICHAEL F. DALY.
BY
ATTORNEYS.

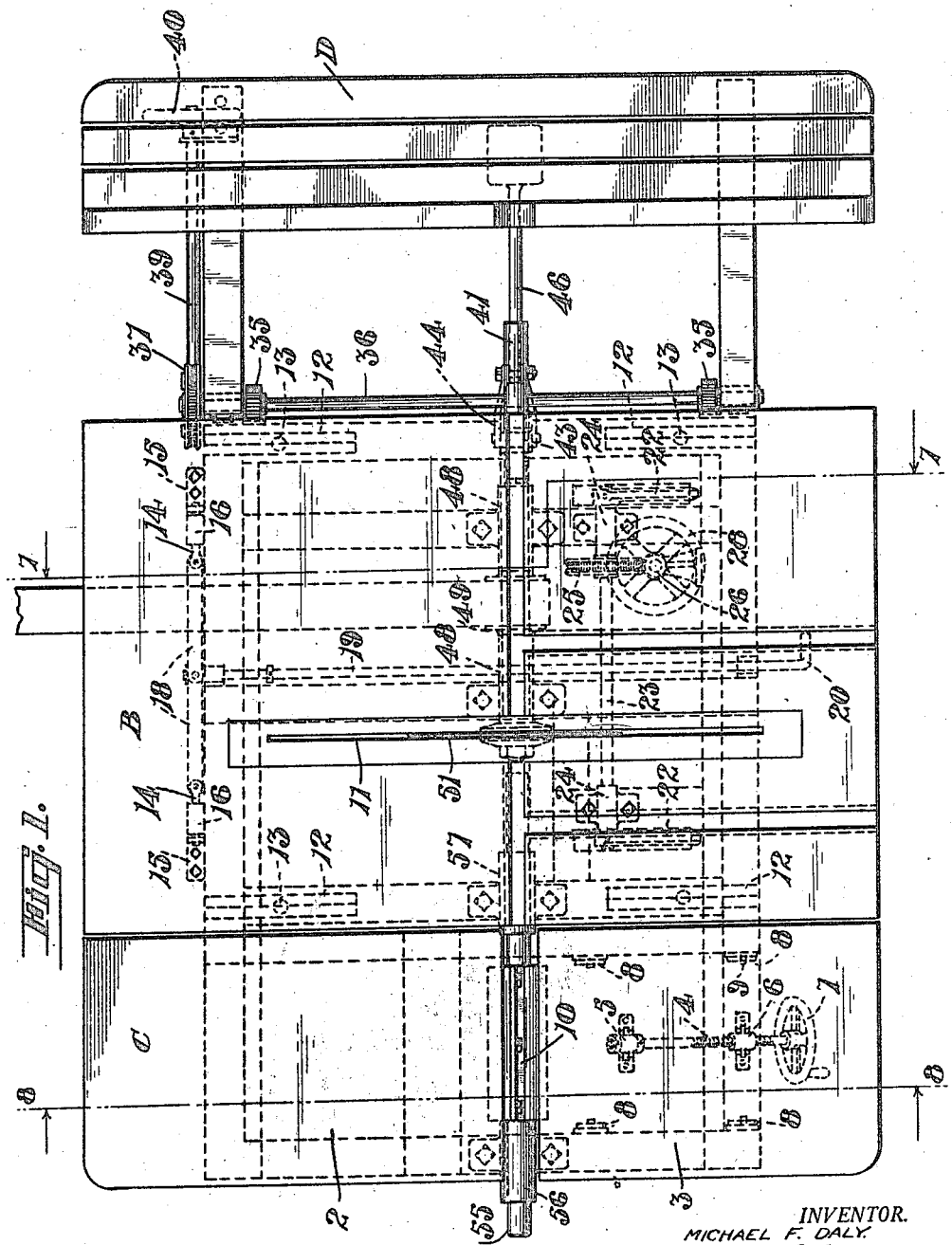

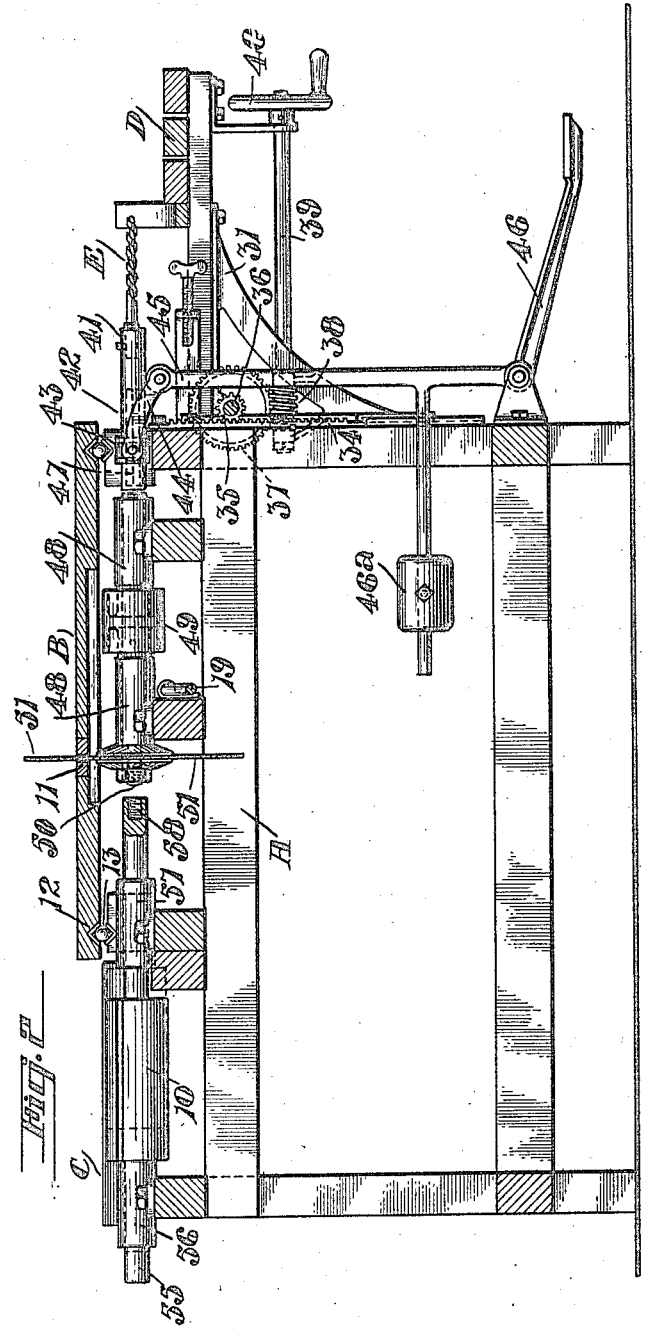

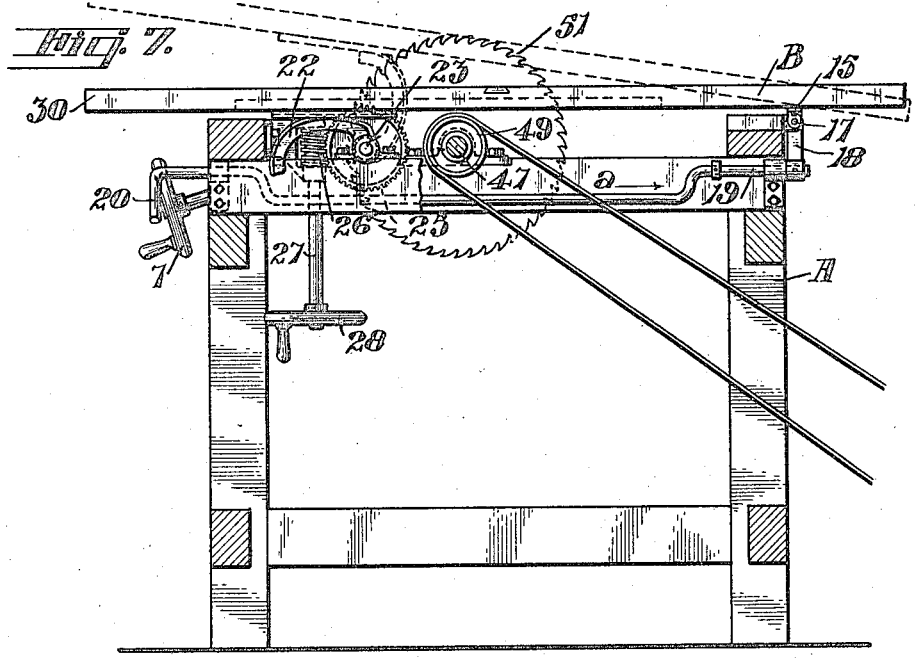
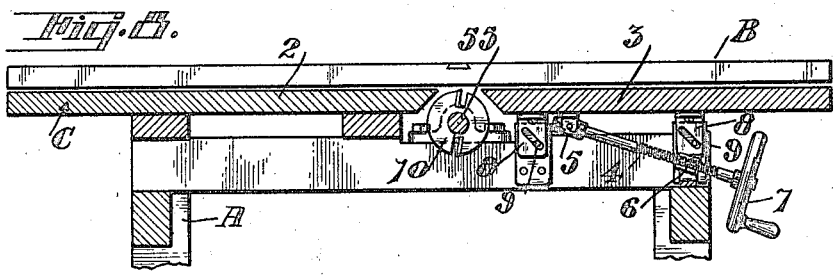

Patented Jan. 1, 1924.

1,479,058

UNITED STATES PATENT OFFICE.

MICHAEL F. DALY, OF MILLBRAE, CALIFORNIA.

WOODWORKING MACHINE.

Application filed January 23, 1923. Serial No. 614,398.

*To all whom it may concern:*

Be it known that I, MICHAEL F. DALY, a citizen of the United States, residing at Millbrae, county of San Mateo, and State of California, have invented new and useful Improvements in a Woodworking Machine, of which the following is a specification.

This invention relates to a wood working machine and especially to a combined joiner, circle saw and boring machine.

Every well equipped wood working machine shop in operation today is usually provided with one or more standard makes of wood working machines, such as joiners, planers, band saws, circle saws, boring machines, shapers, turning lathes, etc. These machines are usually constructed as independent units and as such require considerable space and individual operators, and furthermore require numerous transfers of material from one machine to another as work progresses.

Machines of this character, and particularly circle saws, joiners, boring machines, etc., are also employed by building contractors and are usually of the portable type to permit them to be readily moved from one building site to another.

All of the machines referred to, whether designed for shop or portable use, are substantial and well designed and efficient as far as individual operation is concerned, but they are costly when a number of machines are required. They consume unnecessary space; considerable power is required for their individual operation; time is wasted by transferring work from one machine to another, and skilled operators are more or less indispensable as each machine must be carefully adjusted and attended to in order to insure proper operation and efficiency.

The object of the present invention is to combine, as a single unit, a circle saw, a joiner and a boring machine, which are supported by a single frame and so arranged that the work may be quickly and readily transferred from the circle saw to the joiner or to the boring machine or vice versa, without carrying the work from one machine to another, thereby saving time and space and permitting certain work to be taken care of by a single operator.

The invention also involves a machine in which the several tools, to-wit, the joiner, circle saw and boring tool, may be driven by a common driving member and all operated in unison or any one operated individually.

The invention further embodies a structure which is generally improved and simplified when comparison is made with machines of this character and which is accessible for inspection, adjustments and repair.

Other objects will hereinafter appear.

One form which my invention may assume is exemplified in the following description and illustrated in the accompanying drawings, in which—

Fig. 1 is a plan view of the machine.

Fig. 2 is a central, longitudinal, vertical section.

Fig. 3 is a detail end view of the circle saw table and a combined hinge and lock employed in conjunction therewith.

Fig. 4 is a detail view of the guide and rack and the gears whereby the boring machine table is raised and lowered.

Fig. 5 is an end view of the machine showing the position of the boring machine table and the mechanism whereby it is vertically adjusted.

Fig. 6 is a detail side elevation of that end of the machine which carries the boring machine attachment.

Fig. 7 is a vertical cross section taken on line 7—7, Fig. 1.

Fig. 8 is a vertical cross section taken on line 8—8, Fig. 1.

Fig. 9 is a cross section of the circle saw table showing the mechanism whereby one end thereof is vertically adjusted.

Referring to the drawings in detail, and particularly to Figs. 1 and 2, A indicates a frame of suitable construction upon which is supported a circle saw table B, a joiner table C, and a boring machine table D. The joiner table consists of two sections as shown in Figs. 1 and 8, the section indicated at 2 being stationary, and the section indicated at 3 being vertically adjustable to regulate the thickness of cut desired. The means for raising and lowering the table section 3 consists of a threaded rod 4, a pivotally mounted journal 5, a pivotally mounted nut 6, an operating handle 7, and a pair of bracket members 8, which are angularly slotted to engage stationary pins 9. Turning movement of the rod 4 slightly advances or retracts the table 3 with relation to the joiner generally indicated at 10 and is simultaneously vertically adjusted by the slotted bracket plates 8, due to their engagement with the stationary pins 9.

The circle saw table shown in Figs 1, 2, 6 and 9, is transversely movable with relation to the frame A, and it is also pivotally mounted with relation thereto as will hereinafter be described, and it is furthermore slotted as indicated at 11 to permit the transverse and pivotal movement. The transverse movement is permitted as trackways are supported transversely of the main frame as indicated at 12. Inverted tracks are similarly placed on the lower side of the table and ball bearings 13 are interposed between the opposed trackways, thus providing an anti-friction bearing upon which the table may be transversely moved when handling certain work. The pivot about which the table swings is disposed at one end of the table at the points generally indicated at 14, see Fig. 1. The pivots are perhaps best illustrated in Fig. 3. They consist of a pair of perforated lugs 15 secured to the underside of the table; a pair of bearing members 16 secured to the main frame; a pair of pins 17 slidably mounted in the bearings, and links connecting the pins as indicated at 18. These links are in turn connected to a rod 19, which is positioned transversely of the frame and which terminates in a handle section 20. When the rod 19 is grasped by means of the handle 20 and pushed inwardly in the direction of arrow $a$, see Figs. 3 and 7, the links 18 assume the dotted line position indicated at 21, see Fig. 3. This movement of the links pulls the pins 16 out of the perforated lugs 15 and thus releases the table, permitting it to move transversely of the main frame on the anti-friction bearings as described. When the rod 19 is pulled in the opposite direction so that the links 18 will assume the full line position shown in Fig. 3, the pins 17 are projected and will thus enter the perforated lugs 15. The table is then locked against transverse movement and the pins at the same time form pivots about which the table may be swung.

To raise the circle saw table on the pivots, a pair of cam members 22 is employed. These cams are best illustrated in Figs 7 and 9. They are secured on the outer ends of a shaft 23, which is suitably journaled in the main frame as indicated at 24. Secured on the shaft is a worm gear 25, and engaging the worm gear is a worm 26 which in turn is secured on a shaft 27 carrying a hand wheel 28. The hand wheel when rotated in one direction imparts a turning movement to the gears 25 and 26 and as such rotates the shaft 23, and as the cam members 22 are secured on the outer ends of the shaft, it is obvious that they will either raise or lower the table about the pins 17 as shown in Fig. 7. The adjustment obtained by means of the cams 22 is employed when ripping lumber and when dado saws are employed, and as such is of considerable importance as it maintains the work in proper position with relation to the saw or dado blades as the case may be. The table may be further raised by grasping the end thereof indicated at 30. The table swings freely on the pins 17 and it may therefore be raised as high as desired. This is also of importance as it permits accessibility when changing saws or otherwise.

The boring machine table is perhaps best illustrated in Figs. 1, 2, 5 and 6. The table proper indicated at D is supported by a pair of angle brackets or arms 31. The inner ends of these brackets are dovetailed, as shown at 32 in Fig. 4, and are guided with relation to the end posts 33 of the main frame. Each bracket is also provided with a rack gear 34 engaged by a pinion 35. There are two bracket members in this instance and therefore two rack bars, and similarly two pinions 35. The pinions 35 are secured on a transverse shaft 36 and this shaft is rotated by means of a worm gear and worm 37 and 38, the worm 38 being secured on a shaft 39 which is operated by a hand wheel 40. In other words turning movement imparted to shaft 39 by the hand wheel is in turn transmitted to the shaft 36, and as the pinions 35 are secured thereto, it is obvious that the rack bars and the bracket arms 31 will be raised or lowered in unison as the case may be, and as the table D is carried by the brackets, any vertical adjustment desired may be obtained. The table is raised and lowered with relation to a bit or boring tool generally indicated at E. The bit is secured on a chuck 41 of suitable construction which is extended to form a splined sleeve 42. The sleeve is provided with a grooved exterior collar 43 which is engaged by a forked link 44. This link is pivotally attached to the upper end of an arm 45 which forms an extension of a foot lever 46. The sleeve 42 is splined with relation to the main driving shaft generally indicated at 47, said shaft being journaled as indicated at 48, and being driven from any suitable source by means of a pulley 49. The shaft 47 is the main driving shaft and is provided with a reduced arbor on one end as indicated at 50 to receive and secure the saw which is indicated at 51. Any type of saw may be employed, for instance, a circular cross cut, a rip or otherwise, and two or more blades may be applied to form a dado head.

The bit E is rotated by means of the sleeve 42 and the splined connection formed between the sleeve and the driving shaft, and as the sleeve is slidably mounted on the shaft, it is obvious that the bit may be advanced or retracted with relation to any work supported upon the table D. The bit is advanced by pressure on the foot lever 46 and it is returned by means of a counterweight 46ª.

The joiner previously referred to by the numeral 10, see Fig. 2, is carried by an auxiliary shaft 55 which is journaled at the points indicated at 56 and 57. One end of the shaft is internally threaded, as at 58, the pitch and size of the thread being the same as that formed on the outer end of the arbor 50. The arbor and the internally threaded end of shaft 55 may thus be connected or coupled as the joiner is splined to the shaft to permit endwise movement when coupling and power may in this manner be transmitted from the main driving shaft 47 to rotate the auxiliary shaft 55 on which the joiner is secured. In other words with the shafts 47 and 55 coupled, it is best to operate all three tools in unison. By coupling the shafts 55 and 47, it is possible to operate the boring machine and the circle saw in unison. By removing the bit E, it is possible to operate the circle saw as a single unit, and again by removing the circle saw and applying the bit, the bit may be operated as a single unit. Further, by removing both the bit and the saw and again coupling the shafts 47 and 55, it is possible to operate the joiner as a single unit. This is of considerable importance as local ordinances in certain districts do not permit the operation of more than one tool at any one time. In other districts one or more tools may be operated in unison and if this is the case such operation is possible.

The tool here illustrated is particularly adapted for use by building contractors and the like as the most essential tools required are all assembled in a single frame and as such may be readily transferred from one building site to another. The tools may be operated independently or in unison if desired and as such have proven a great time saver as a piece of lumber requiring sawing, joining and boring may be quickly handled by a machine of this character and without loss of time as all tools are in operation and the work does not have to be carried from one machine to another, but is merely moved from one tool to another without the operator changing his position to any extent. The tool is also adapted for shop use and particularly in small shops where expense is an item and where several individual tools prove too expensive.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a machine of the character described, a main frame, a driving shaft journaled therein, a circle saw secured on the shaft and driven thereby, a table transversely movable with relation to the saw and the frame, and means permitting pivotal movement of the table with relation to the saw and the frame, said means comprising a pair of perforated lugs carried by the table, a pair of bearing members carried by the frame, a pin slidable in each bearing member and adapted to enter or be retracted with relation to the perforated lugs, and manually operated means for retracting or projecting the pins in unison.

2. In a machine of the character described, a main frame, a driving shaft journaled therein, a circle saw secured on the shaft and driven thereby, a table transversely movable with relation to the saw and the frame, and means permitting pivotal movement of the table with relation to the saw and the frame, said means comprising a pair of perforated lugs carried by the table, a pair of bearing members carried by the frame, a pin slidable in each bearing member and adapted to enter or be retracted with relation to the perforated lugs, and manually operated means for retracting or projecting the pins in unison, said means comprising a rod longitudinally movable and a pair of links connected at one end to the rod and at their opposite ends to the respective pins.

3. In a machine of the character described a circle saw, a table transversely movable with relation thereto, and means for locking the table against transverse movement, said means also permitting pivotal movement of the table.

4. In a machine of the character described, a circle saw, a table transversely movable with relation thereto, and means forming a combination lock and pivotal support for the table, and said means comprising a pair of perforated lugs secured to the table, a pair of stationary bearing members, a pin in each bearing member adapted to be projected or retracted with relation to the perforated lugs, and means for projecting or retracting the pins in unison.

5. In a machine of the character described, a circle saw, a table transversely movable with relation thereto, and means forming a combination lock and pivotal support for the table, and said means comprising a pair of perforated lugs secured to the table, a pair of stationary bearing members, a pin in each bearing member adapted to be projected or retracted with relation to the perforated lugs, and means for projecting or retracting the pins in unison, said last named means comprising a pair of links one pivotally connected with each pin, a rod disposed at right angles to the links, and a pivotal connection between the rod and the links.

6. In a machine of the character described, a circle saw, a table transversely movable with relation thereto, means for locking the table against transverse movement, said means also permitting pivotal movement of the table, and means for raising one end of the table with relation to the combined lock and pivoting member.

7. In a machine of the character described, a circle saw, a table transversely movable with relation thereto, a pair of pins movable into and out of engagement with the table to lock the same against transverse movement, said pins also forming a pivotal support for one end of the table, and means for raising and lowering the other end of the table to swing it about the pivot.

8. In a machine of the character described, a circle saw, a table transversely movable with relation thereto, a pair of pins movable into and out of engagement with the table to lock the same against transverse movement, said pins also forming a pivotal support for one end of the table, means for raising and lowering the other end of the table, said means comprising a shaft, a cam on the shaft engageable with the table, and means for imparting a turning movement to the shaft and cam.

9. In a machine of the character described, a circle saw, a table transversely movable with relation thereto, a pair of pins movable into and out of engagement with the table to lock the same against transverse movement, said pins also forming a pivotal support for one end of the table, means for raising and lowering the other end of the table, said means comprising a transverse shaft, a pair of cam arms secured thereto and engaging the under side of the table, an worm gear secured on the shaft, a worm intermeshing therewith, and means for imparting a turning movement to the worm.

MICHAEL F. DALY.